United States Patent [19]

Shimazu et al.

[11] Patent Number: 5,427,212
[45] Date of Patent: Jun. 27, 1995

[54] BRAKE DISC ROTOR

[75] Inventors: Takashi Shimazu; Haruo Katagiri, both of Aichi; Shigeru Sakamoto; Hidetoshi Shimizu, both of Shizuoka; Akio Inatomi, Aichi; Masashi Ishihara, Aichi; Toru Shinoda, Aichi, all of Japan

[73] Assignees: Kabushiki Kaisha Toyota Chuo Kenkyusho; Toyota Jidosha Kabushiki Kaisha, both of Aichi; Aisin Takaoka Co., Ltd., Toyota, all of Japan

[21] Appl. No.: 312,077

[22] Filed: Sep. 26, 1994

Related U.S. Application Data

[63] Continuation of Ser. No. 90,398, Jul. 13, 1993, abandoned.

[30] Foreign Application Priority Data

Jul. 15, 1992 [JP] Japan .................................. 4-210868

[51] Int. Cl.6 ............................................ F16D 65/847
[52] U.S. Cl. ............................ 188/218 XL; 188/71.6; 188/264 AA; 192/113.23; 310/58
[58] Field of Search ........... 188/218 XL, 71.6, 264 A, 188/264 AA, 218 A, 218 R, 18 A, 73.2, 71.1; 192/113.2, 113.23, 113.26, 113.1; 310/105, 52, 58, 59, 60 R, 61, 60 A

[56] References Cited

U.S. PATENT DOCUMENTS

| 2,369,328 | 2/1945 | Watts | 188/264 AA |
|---|---|---|---|
| 3,298,476 | 1/1967 | Day | 188/264 AA |
| 3,394,780 | 7/1968 | Hodkinson | 188/264 AA |
| 4,083,435 | 4/1978 | Gallus et al. | 188/264 A |
| 4,379,501 | 4/1982 | Hagiwara et al. | 188/218 XL |
| 4,469,203 | 9/1984 | Herbulot et al. | 188/218 XL |
| 4,523,666 | 6/1985 | Murray | 188/218 XL |
| 4,638,891 | 1/1987 | Wirth | 188/264 A |
| 4,928,798 | 5/1990 | Watson et al. | 188/218 XL |
| 5,137,123 | 8/1992 | Setogawa et al. | 188/264 AA |
| 5,161,652 | 11/1992 | Suzuki | 188/218 XL |
| 5,188,203 | 2/1993 | Winter | 188/71.6 X |
| 5,284,230 | 2/1994 | Takaki | 188/218 XL |

FOREIGN PATENT DOCUMENTS

| 0109035 | 5/1984 | European Pat. Off. |  |
|---|---|---|---|
| 986658 | 12/1943 | France | 188/264 R |
| 1630304 | 6/1971 | Germany . |  |
| 2406133 | 8/1974 | Germany | 188/218 XL |
| 3539640 | 10/1986 | Germany | 188/264 A |
| 3740311 | 6/1989 | Germany | 188/71.6 |
| 4003732 | 8/1991 | Germany | 188/264 AA |
| 44-443 | 1/1969 | Japan . |  |
| 56-56940 | 5/1981 | Japan . |  |
| 58-19866 | 2/1983 | Japan . |  |
| 4-210133 | 7/1992 | Japan | 188/218 XL |
| 1156316 | 6/1969 | United Kingdom . |  |
| 2024966 | 1/1980 | United Kingdom | 188/218 XL |
| 2057609 | 4/1981 | United Kingdom . |  |
| 2060796 | 5/1981 | United Kingdom . |  |
| 2144186 | 2/1985 | United Kingdom | 188/218 XL |
| 2211253 | 6/1989 | United Kingdom | 188/264 AA |

*Primary Examiner*—Douglas C. Butler
*Attorney, Agent, or Firm*—Oblon, Spivak, McClelland, Maier & Neustadt

[57] ABSTRACT

A brake disc rotor comprising: sliding plates on the inside and outside in parallel with and separated from each other in the axial direction of an axle; fins composed of a plurality of curved long partition walls provided between the sliding plates, radially extending from the internal portion to the external portion, and inclined with respect to the radial direction, and a plurality of curved short partition walls provided in parallel between the mutually adjacent long partition walls and extending from a large-diameter internal portion to the external portion; a plurality of ventilation holes radially divided by the fins and composed of the upper and lower ventilation holes with the short partition walls; and inlet and outlet openings opened inward and outward in the radial direction thereof.

27 Claims, 10 Drawing Sheets

$\theta_2 < \theta_1$ $\theta_2 > \theta_1$

BRAKE DISC ROTOR

This application is a continuation of application Ser. No. 08/090,398, filed on Jul. 13, 1993, now abandoned.

BACKGROUND OF THE INVENTION

1. Field of the Invention

This invention relates to a brake disc rotor of a disc brake device used in a vehicle or the like.

2. Description of the Prior Art

As shown in FIGS. 1 and 2, a brake disc rotor of the prior art includes a plurality of partition walls F formed only radially between disc-shaped sliding plates OP and IP to form inlet openings I, outlet openings O and radial passages H between the partition walls, respectively.

As is apparent from an oil film observation for analyzing the stream within each passage, the prior art brake disc rotor described above has some problems in the following. As shown in both of FIG. 3 showing the processed data according to a styrene particle tracer method and FIG. 4 showing a sketch of the stream based on the above description, the stream, which flows from the inlet opening I into the passage H at an approximate angle of 50° from the velocity triangle composed of the velocity components in the peripheral and radial directions in the inlet opening, generates separation in the thickness direction on the suction surface side from the inlet to the outlet of the partition walls F constituting fins F, to result in a stagnation Y in a large area at the lower portion of each partition wall within the passage H constituting a ventilation hole. Therefore, a main stream area MS becomes very narrow, while a quasi-secondary stream SS occurs due to the collision against the upper surface of each partition wall and a reversed stream RS from the external portion also occurs at the upper portion of the outlet opening.

As a result, the prior art brake disc rotor has disadvantages in that since the pressure loss of the stream is large due to the narrowness of the main stream area MS, the surface heat transfer coefficient in the passage area by cooling wind is lowered to give bad efficiency in blowing and cooling of the rotor, and since the cooling area is reduced, the total quantity of heat dissipation is decreased.

This fact is more remarkable when increasing the number of sheets of fins in order to enlarge the cooling area, and particularly, there is a disadvantage in that the cross section of the inlet portion becomes small and the inflow resistance is increased.

SUMMARY OF THE INVENTION

The present inventors analyzed various streams using the processed images by a tracer method and oil film observation photos as to the prior art brake disc rotor. As a result, the present inventors have perceived a technical idea of the present invention that if the inflow resistance at the inlet portion is reduced and the flow separation is prevented by increasing the number of sheets of fins provided at an outer portion of the brake disc rotor, which are widely spaced between the fins and effective in blowing and cooling, and by reducing the number of sheets of fins provided at an inner portion thereof, which are narrowly spaced between the fins and required to decrease the inflow resistance. The stagnation area, which obstructs the main stream area MS, becomes narrow and the main stream area is enlarged to enable the blowing and cooling action to be effectively performed by the fins on the external side.

It is an object of the present invention to prevent the separation by reducing the inflow resistance by enlarging the opening area of an inlet opening.

Another object of the present invention is to improve (i.e. the lowering of) the heat transfer coefficient by the cooling wind on the ventilation hole surface, by decreasing the stagnation area in the ventilation hole to lessen the pressure loss of the stream.

A further object of the present invention is to improve the blowing and cooling efficiency of the rotor by effectively blowing and cooling by use of long and short partition walls on the outer portion thereof.

A still further object of the present invention is to increase the total quantity of heat dissipation by enlarging the cooling area.

A yet further object of the present invention is to provide a brake disc rotor constituted by alternately arranging long partition walls respectively extending from the outer portion to the inner portion and short partition walls respectively extending from the outer portion to the middle portion such that the tip end of each short partition wall is disposed in the trailing area with respect to a line connecting between the tip end of each long partition wall and the center of the brake disc rotor.

A yet further object of the present invention is to provide a brake disc rotor, in which the number of sheets of fins provided at the outer portion of the brake disc rotor, widely spaced between the fins and effective in blowing the cooling is made larger than the number of sheets of fins provided at the inner portion of the brake disc rotor, narrowly spaced between the fins and required to lessen the inflow resistance.

According to the present invention, a brake disc rotor comprises at least two disc-shaped sliding plates separately provided in the axle direction on the inside and outside portions of said brake disc rotor, and each having a sliding surface on one side thereof; a plurality of long partition walls radially extending from the small-diameter inner portion to an outer portion of said sliding plates and inclined to the radial direction of the brake disc rotor; a plurality of short partition walls radially provided between the mutually adjacent long partition walls extending from a large-diameter inner portion to the outer portion of the sliding plates and inclined to the radial direction thereof; a plurality of passages radially formed between said plurality of long and short partition walls; and a plurality of inlet and outlet openings communicating with said plurality of passages and opening inward and outward in the radial direction.

According to the present invention, it is preferable to provided brake disc rotor wherein the long and short partition walls are in the form of curved fins and the inner end portion thereof is placed along the inlet angle of the stream.

It is further preferable to provide a brake disc rotor wherein the inner diameter of said outside sliding plate is less than that of said inside sliding plate, and the height of the inner end portion of said long partition wall provided on the outside sliding plate gradually increases as the long partition wall comes closer to the outer portion of the outside sliding plates.

It is further preferable to provide a brake disc rotor wherein the opposed interval between the outside and inside sliding plates is gradually reduced as said disc-like sliding plates come closer to the outer portion thereof.

In the brake disc rotor of the present invention, the stream flown from each inlet opening constructed by the mutually adjacent long partition walls is divided into two parts by each short partition wall provided between the mutually adjacent long partition walls at the position where the passage area becomes relatively large to form the stream flowing between the long and short partition walls, and a blowing and cooling action is exerted on the outer portion of the long and short partition walls.

Further, since the stream smoothly flown from each inlet opening constructed by the mutually adjacent long partition walls provided along the inlet angle of the stream is divided into two parts by each short partition wall provided between the mutually adjacent long partition walls at the position where the passage area becomes relatively large, the brake disc rotor of the present invention exerts such an effect as to form the stream flowing between the long and short partition walls in the form of curved fins.

In addition to the effect of the invention described above, the brake disc rotor of the present invention has the height of the inner end portion of each long partition wall formed on the inside surface of the outside sliding plate gradually increased as the long partition wall comes closer to the outer portion thereof, and exerts such an effect as to increase the effective area to each inlet opening constructed by the mutually adjacent long partition walls and to smooth the inflow of the stream.

Since the area of the passage is almost uniformly formed from the inlet opening to the outlet opening, the brake disc rotor of the present invention exerts such an effect as to form a uniform stream.

Since the inflow resistance of the inlet opening is lessened and the blowing and cooling of the rotor are effectively performed by the outer end portion of long and short partition walls, the brake disc rotor of the present invention exerts such an effect as to improve the blowing and cooling efficiency of the rotor and to increase the total quantity of heat dissipation for enlarging the cooling area.

Since the smooth stream is formed in the passage between the long and short partition walls in the form of curved fins by smoothly introducing the stream from the inlet opening, the brake disc rotor of the present invention exerts such an effect as to effectively improve the blowing and cooling efficiency of the rotor.

Since the height of the inner end portion of each long partition wall on the inside surface of the outside sliding plate gradually increases as the long partition wall comes closer to the outer portion thereof, the brake disc rotor of the present invention exerts such an effect as to effectively improve the blowing and cooling efficiency of the rotor by increasing the effective area of the inlet opening to make the inflow of the stream smooth.

Since the passage area is uniformly formed to give a uniform stream within the passage, the brake disc rotor of the present invention exerts such an effect as to improve the blowing and cooling efficiency of the rotor.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 10:
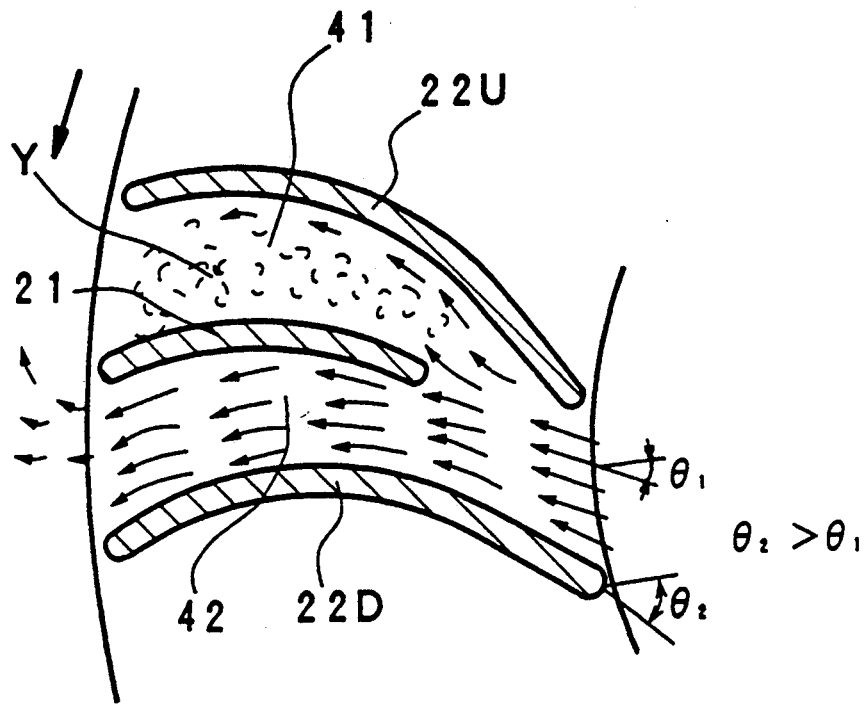
FIG. 10 is a cross-sectional view showing a stream in the case where the installation angle of each fin on the inlet portion is larger than the inlet angle of the stream.
Figure 11:
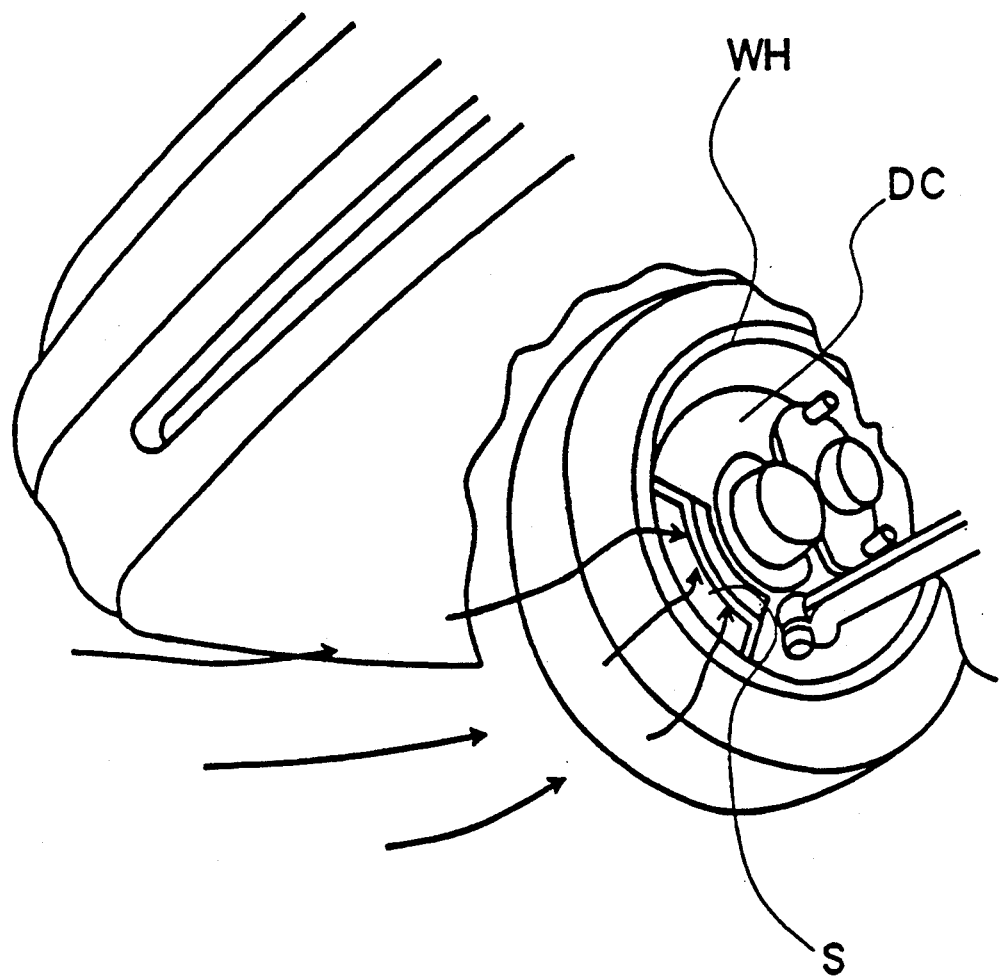
FIG. 11 is a perspective view, partly broken-away, showing a condition that the brake disc rotor as the first preferred embodiment of the present invention is loaded on a vehicle.
Figure 12:
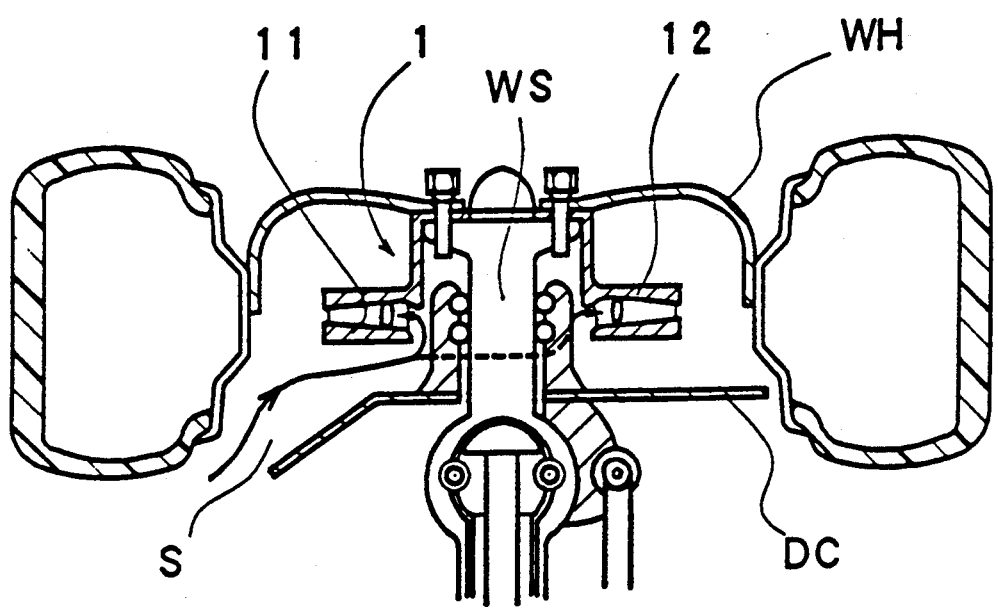
FIG. 12 is a sectional view showing a condition that the brake disc rotor as the first preferred embodiment of the present invention is mounted on a wheel.

A brake disc rotor as a first preferred embodiment is applied to a disc brake device for use in an automobile and introduces air, which is sucked from a suction port S of a dust cover DC mounted on the inside of each wheel WH, into a ventilation hole of a rotor as shown in FIGS. 11 and 12. By using FIGS. 5 through 12, details of the brake disc rotor will be given in the following.

A brake disc rotor 1 of the first preferred embodiment comprises sliding plates 11 and 12 on the inside and outside both provided in parallel to and separately from each other in the axial direction of an axle (not shown); a plurality of fins 2 composed of short partition walls 21 provided in the range roughly corresponding to the inside sliding plate 11 and long partition walls 22 provided in the range corresponding to the outside sliding plate 12; a plurality of openings 31 and 32 opening inward and outward in the radial direction between the sliding plates 11 and 12; and a plurality of ventilation holes 4 for constituting a passage formed by the sliding plates 11 and 12 and the mutually adjacent partition walls 21 and 22.

The sliding plate 12 on the outside is provided integrally with a boss portion 14 having a hole for fixation through a step portion 13 together with the sliding plate 11 on the inside. The sliding plate 12 on the outside is constituted in a same thickness in the radial direction. Whereas the sliding plate 11 on the inside linearly increases in thickness as the sliding plate 11 comes outward in the radial direction to result in linearly reducing the height of the ventilation hole 4.

Fins 2 are 4.5 mm in thickness and radially and integrally formed between the sliding plates 12 and 11 on the outside and inside in the range of 165 mm to 298 mm in diameter. The long partition wall 22 is formed in the range of 165 mm through 298 mm in diameter, and the short partition wall 21 is formed in the range of 200 mm through 298 mm in diameter. The short partition wall 21 and the long partition wall 22 are provided in an alternate manner, and the tip end 21T of the short partition wall 21 is disposed in trailing area (upward in FIG. 7) with respect to the broken line connecting between the center of the brake disc rotor shown in FIG. 7 and the tip end 22T of the long partition wall 22 so that only the long partition wall 22 is presented on the inner portion of the sliding plates 11 and 12 (not more than 200 mm in diameter, i.e., the region within about one-third of the inner portion of the long partition wall 22), and the ventilation hole 4 which will be later described is constituted by the mutually adjacent long partition walls 22. By so doing, the opening area of the inlet is secured in its large size so as to allow its inflow resistance to be made small.

The long partition wall 22 is constituted so as to prevent any flow separation at the inlet portion by setting an installation angle $\theta_2$ at 45° in the range of 40° through 50° with respect to the radial direction of the disc rotor so as to set it at the optimal installation angle along 45° as a specific angle of the inlet angle $\theta_1$ of a stream.

The permissible installation angle of each fin 2 is in the range of approximately 30° through 70° depending on the inlet angle $\theta_1$ of the stream into the ventilation hole 4.

Figure 9:
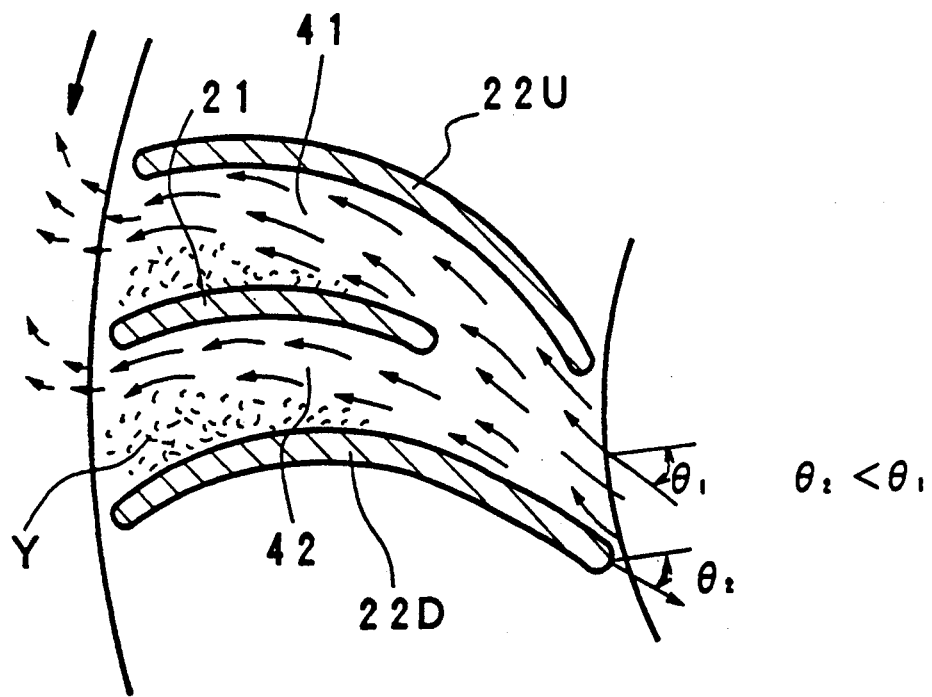
FIG. 9 is a cross-sectional view showing a stream in the case where the installation angle of each fin on the inlet portion is smaller than the inlet angle of the stream.

In the case where the installation angle $\theta_2$ of the inlet portion of the fin 2 is smaller than the inlet angle $\theta_1$ of the stream, a somewhat large stream is formed on the side of the first ventilation hole 41 defined between the upper long partition wall 22U and the short partition wall 21 as shown in FIG. 9, and a somewhat small stream is formed on the side of the second ventilation hole 42 defined between the short partition wall 21 and the lower long partition wall 22. As a result, some flow separation is generated on the suction surface side of the upper portion of the lower long partition wall 22 defining the second ventilation hole 42, thereby enlarging the stagnation area Y and decreasing the flow quantity, which leads to the lowering of cooling capacity.

On the contrary, in the case where the installation angle $\theta_2$ of the inlet portion of the fin 2 is larger than the inlet angle $\theta_1$ of the stream, most of the stream is formed on the side of the second ventilation hole 42 defined between the lower long partition wall 22 and the short partition wall 21 as shown in FIG. 10, and almost any stream is not formed on the side of the first ventilation hole 41 defined between the upper long partition wall 22U and the short partition wall 21. Therefore, a wide stagnation area Y is formed and the flow quantity is further decreased, whereby cooling capacity is lowered.

In the case where a sufficient blowing and cooling effect is required, it is preferable to make an installation angle of the inlet portion of the fin 2, 40° through 50° as a desirable range although it depends on the installation interval and revolving speed of the fins. In the first preferred embodiment, a predetermined angle is set as 45° out of the range of 40° through 5°.

The long partition wall 22 and the short partition wall 21 of the fin 2 are formed into fins having an arch-like and curved shape and inclined only by an optimal angle in the rotary direction, so that any flow separation on the pressure surface side of the fin is prevented and the surface area is increased by making the effective length of the fin longer.

When the fin 2 is inclined in the reverse direction against the rotary direction, the flow separation on the external portion is caused. Even though it may be the case where the fin 2 is inclined in the rotary direction, any extreme gradients are not desirable, since the flow separation is caused on the suction surface of the fin 2. Therefore, it is preferable to set the shape of the outer end portion of the fin 2 in the neighborhood of a radial vector closely to the radial direction as shown in the first preferred embodiment.

The ventilation hole 4 is linearly enlarged as the thickness of the inside sliding plate 11 is increased outward in the radial direction. The height of the ventilation hole is 20 mm at an inlet opening 31 and its height is 13 mm at an outlet opening 32. Since the fin 2 is radially formed, the sectional area is made approximately uniform.

Figure 1:
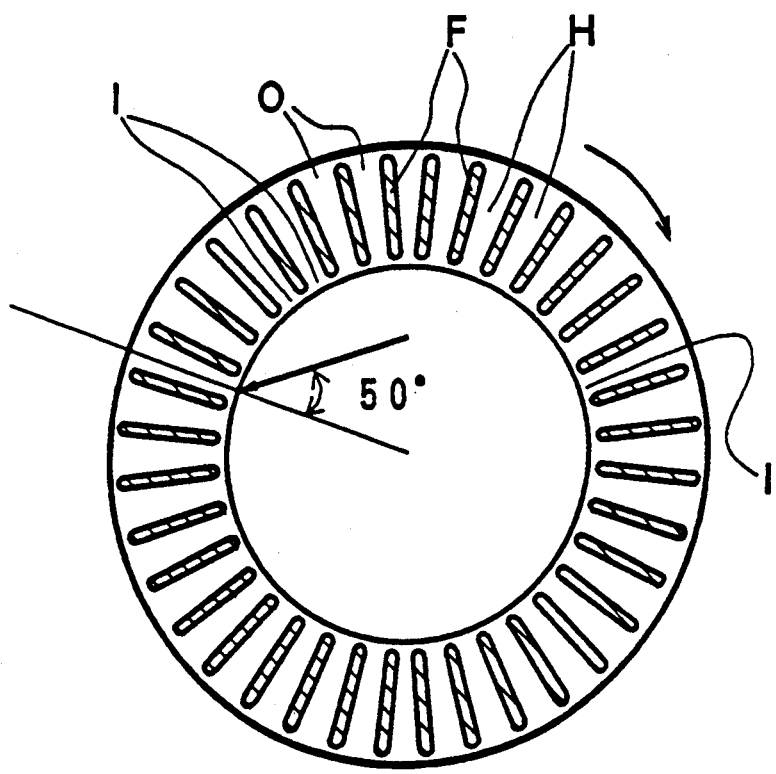
FIG. 1 is a cross-sectional view showing a prior art brake disc rotor and taken along a line B—B in FIG. 2.
Figure 2:
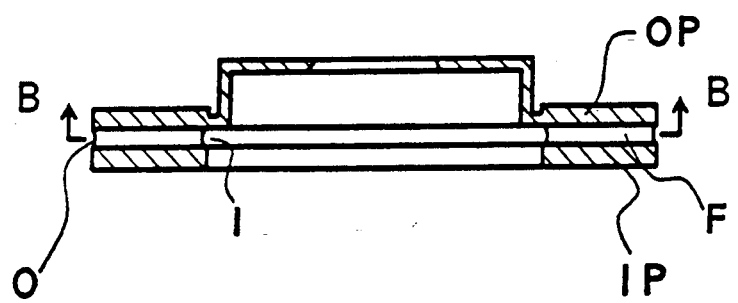
FIG. 2 is a longitudinal-sectional view showing the prior art brake disc rotor.
Figure 6:
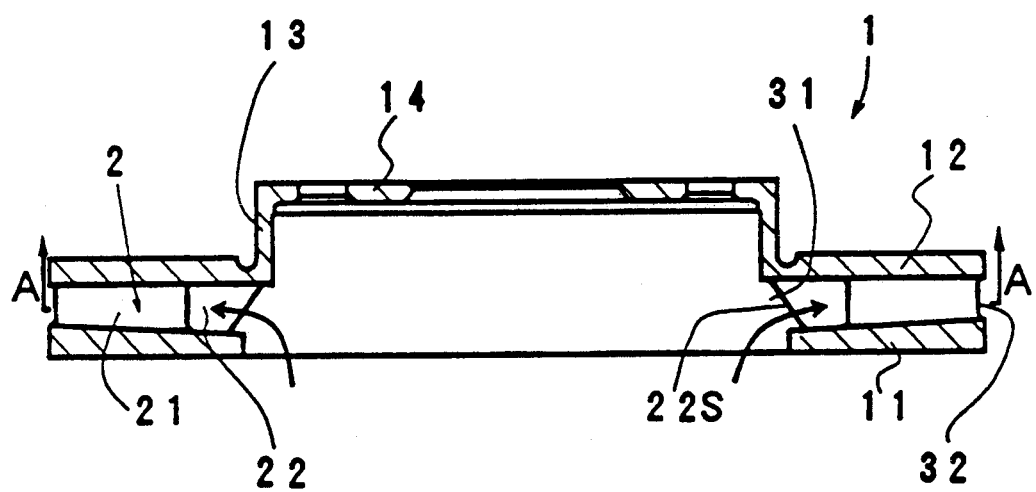
FIG. 6 is a longitudinal-sectional view showing the brake disc rotor as the first preferred embodiment of the present invention.
Figure 3:
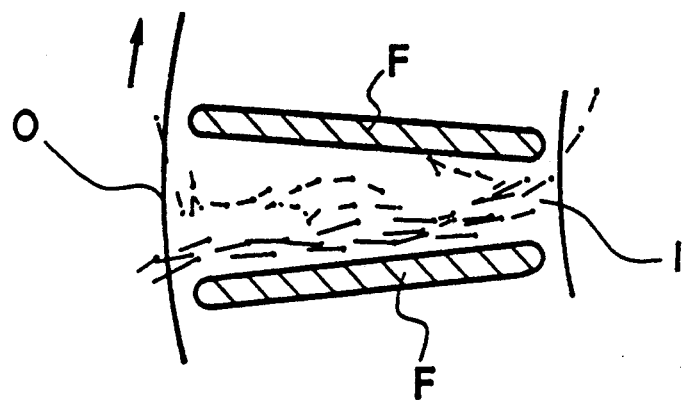
FIG. 3 is a sectional view showing a stream within the prior art brake disc rotor by tracer particle process data.
Figure 4:
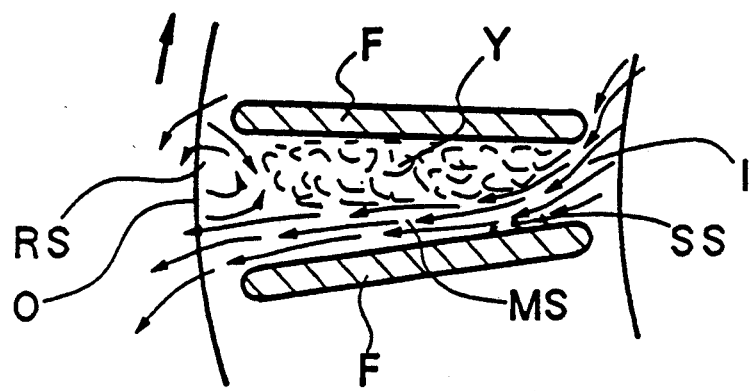
FIG. 4 is a sectional view showing a stream within the prior art brake disc rotor.
Figure 5:
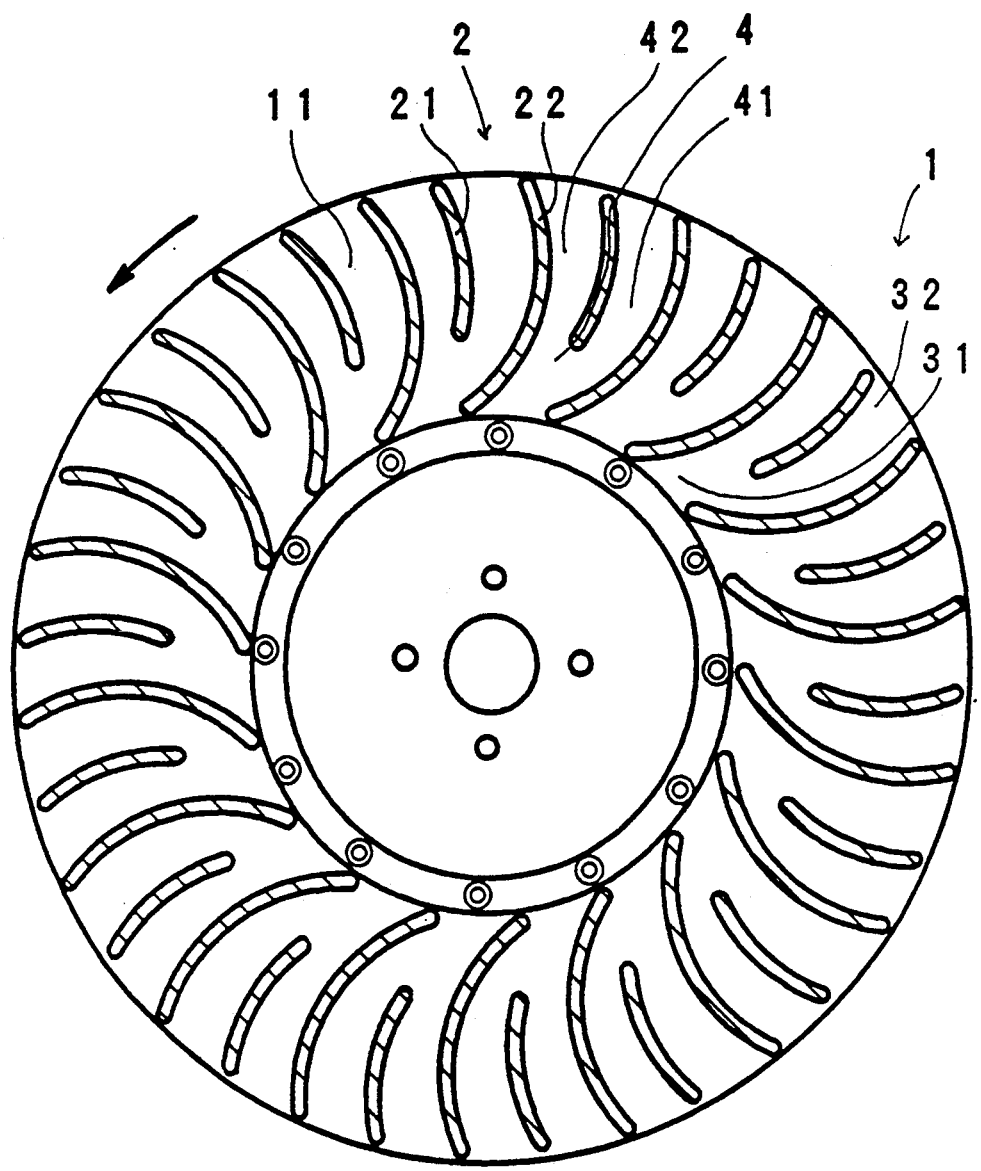
FIG. 5 is a cross-sectional view showing a brake disc rotor as a first preferred embodiment of the present invention and taken along a line A—A in FIG. 6.

The outside sliding plate 12 is projected inward in the radial direction from the inside sliding plate 11 as shown in FIGS. 5 and 6. The long partition wall 22 has a rectilinear inclined portion 22S formed by linearly increasing its height from the inner diameter of the outside sliding plate 12 to the inner diameter portion of the inside sliding plate 11, so that the actual area of the inlet opening is enlarged and the stream in the axial direction of the rotor I is readily changed into the stream outward in the radial direction. Further, the stream is made to smoothly flow in the ventilation hole 4 through the inlet opening 31 by reducing the inflow resistance.

The overall operation of the first preferred embodiment is as follows.

Figure 7:
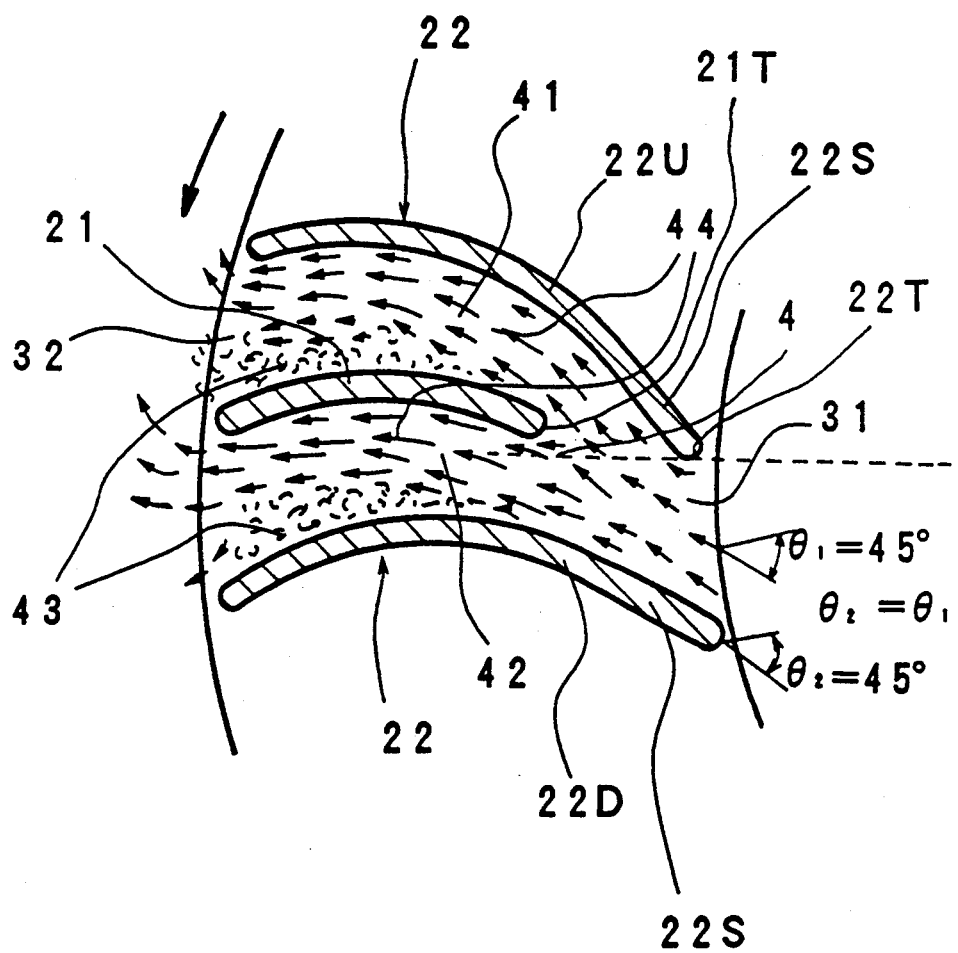
FIG. 7 is a cross-sectional view showing a stream within the brake disc rotor as the first preferred embodiment of the present invention.
Figure 8:
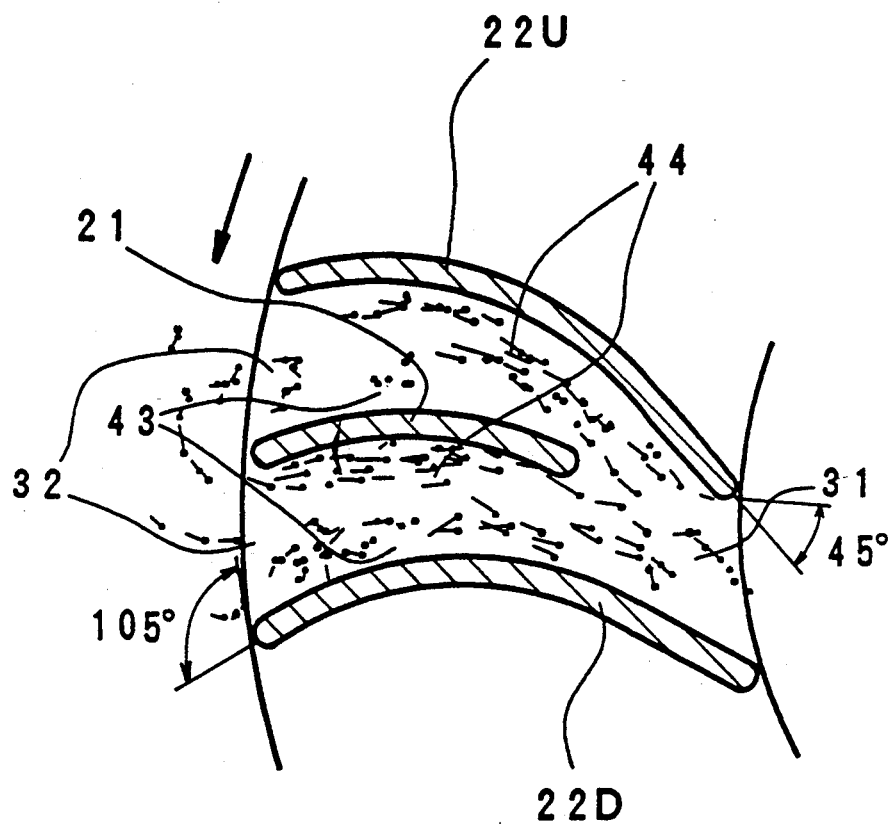
FIG. 8 is a sectional view showing a stream within the brake disc rotor as the first preferred embodiment of the present invention by tracer particle process data.

The brake disc rotor of the preferred embodiment described above smoothly transforms the axial stream into the radial stream by the rectilinear inclined portion 22S of the long partition wall 22 at the inlet opening 31 as shown in FIG. 6, which allows the stream to flow into the ventilation hole 4 at the inlet angle of 45°, passing through the ventilation holes 41 and 42 respectively defined between the upper long partition wall 22U and the short partition wall 21 and between the short partition wall 21 and the lower long partition wall 22D, thereby controlling the generation of the flow separation on the suction surface side of each partition wall 21 or 22 of the fin 2 and reducing the stagnation area 43 to form a wide main stream area 44, as shown in FIG. 7. This fact is apparent from FIG. 8 which shows the tracer particle process data by a styrene particle tracer method for making stream visible that traces floating styrene particles which follow the stream. In this styrene particle tracer method, it is possible to obtain a velocity vector at a local place by determining each correspondence of the floating particle position continuously incorporated, the results thus obtained well corresponding to air-speed measurement data, and accordingly this is suitable to an observation of a main stream.

Since the brake disc rotor of the preferred embodiment having the operation described above has the long partition wall 22 of the fin 2 disposed at an angle along the inlet angle of the stream as shown in FIG. 7, the smooth stream along the fin 2 is formed. Therefore, the generation of the stagnation area 41 due to the flow separation on the suction surface side is controlled, and a wide main stream area 42 is formed in the most desirable form by controlling the generation of a prior art quasi-secondary stream. As a result, the brake disc rotor has an effect for improving the blowing and cooling efficiency of the rotor 1 and increasing the total quantity of heat dissipation in order to expand the effective cooling area by minimizing the pressure loss of the stream and by lessening the lowering of the heat transfer efficiency by the surface of cooling wind.

Since the tip end 21T of the short partition wall 21 of the fin 2 is disposed in the trailing area with respect to a broken line connecting between the center of the brake disc rotor and the tip end 22T of the long partition wall 22 as shown in FIG. 7 and the opening area of the inlet opening 31 is enlarged to make the inflow resistance of the stream small, the brake disc rotor has an effect for increasing the air quantity and its flow rate to improve the blowing and cooling efficiency.

Furthermore, since the cooling capacity is in proportion to the heat dissipation area, it is important to increase the heat dissipation area. In the first preferred embodiment, the number of sheets of the fins 2 is increased by the combination of the short partition wall 21 and the long partition wall 22 and the fin as the curved fin is lengthened, so that the heat dissipation efficiency is increased by remarkably enlarging the effective heat dissipation area. As a result, the cooling capacity can be largely enhanced.

The cooling capacity as a quantity of heat dissipation is expressed by a product of a heat dissipation area, a heat transfer coefficient and a temperature difference to one another, and in the case of a heat transfer by forced convection, the heat transfer coefficient is in proportion to the power of 0.5 through 0.8 of a flow rate. Therefore, the increase in flow rate is essential to the improvement of the cooling capacity. In other words, since the first preferred embodiment can decrease the passage resistance and increase the flow rate, it improves the quantity of heat dissipation and the cooling capacity.

Since the brake disc rotor 1 of the first preferred embodiment has the rectilinear inclined wall 22S formed on the long partition wall 22 at the inlet opening 31 as shown in FIG. 6, the axial stream is smoothly transformed into the radial stream and the inflow resistance is reduced. Therefore, the brake disc rotor 1 has an effect for effectively preventing the flow separation of the stream generating around the tip end of the inner wall of the inside sliding plate 11.

Furthermore, since the inlet portion (the inner end portion of the long partition wall 22) of the fin 2 is formed at an angle of 40° through 50° in the first preferred embodiment, the brake disc rotor has an effect for being capable of most effectively controlling the stagnation due to the flow separation at the inlet portion of the fin 2.

Moreover, in the first preferred embodiment, any area change within the ventilation hole 4 is reduced by varying the height of the ventilation hole, and the reduction of the pressure loss is made by forming a uniform stream to result in giving an effect for attaining the increase in flow quantity.

A brake disc rotor of a second preferred embodiment of the present invention is constituted from the standpoint of emphasizing on the improvement of the stream within the ventilation hole 4 such that, in particular, the shape of a short partition wall 51 of a fin 5 and the installation angle in the neighborhood of the outlet opening of each partition wall are altered in order to more effectively control the flow separation of the stream on the suction surface side of the short partition wall 51 and the generation of any stagnation, although the length of the fin 5 is sacrificed more or less.

Figure 13:
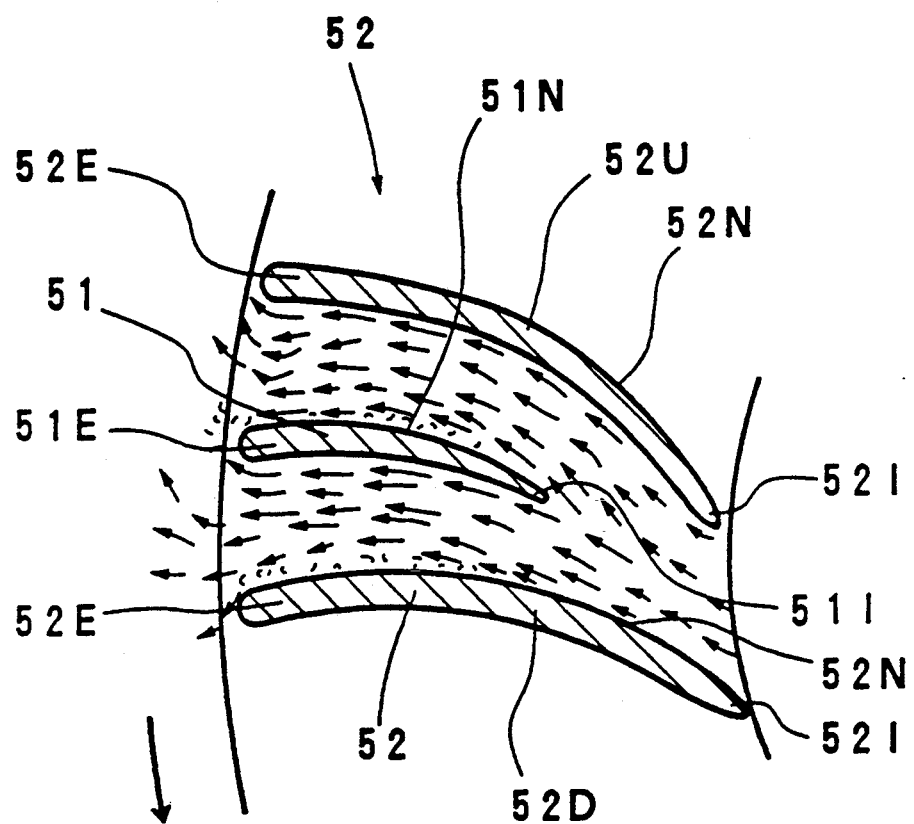
FIG. 13 is a sectional view showing a stream within a brake disc rotor as a second preferred embodiment of the present invention.

As shown in FIG. 13, the inner end portions 51I and 52I of the short partition wall 51 and the long partition wall 52 of the fin 5 are respectively formed so as to gradually increase in thickness so that the stream flows along suction surfaces 51N and 52N. In particular, the inner end portion of the short partition wall 51 is arranged to gradually increase in thickness over a wide range and inclined more or less so as to be able to approach the lower long partition wall 52D in comparison with that in the first preferred embodiment. The outer end portions 51E and 52E of the respective partition walls 51 and 52 are formed in the approximately radial direction while being inclined upward in FIG. 13 in comparison with those in the first preferred embodiment. Namely, the inner end portions 51I and 52I of the fin 5 are formed at an angle of 40° through 50° in the radial direction of the rotor similar to those in the first preferred embodiment. However, the outer end portions 51E and 52E are formed at a smaller angle than that of the inner end portions in the approximately radial direction. On the contrary, the outer end portions 51E and 52E are set at a positive or negative angle close to the radial direction, and the inner end portions 51I and 52I can also be set at a larger positive angle than that of the external side portions.

Since the stream flown into the ventilation hole 4 as shown in FIG. 13 flows along the suction surface sides 51N and 52N of the inner end portions 51I and 52I of the tapered fin 2, the flow separation and stagnation of the stream are further effectively controlled, and the outer end portions 51E and 52E of the respective partition walls 51 and 52 are formed in the approximately radial direction, so that almost any stagnation is not formed by preventing the generation of the flow separation on the suction surfaces of the outer end portions to improve the blowing and cooling efficiency. As a result, the stream flows smoothly along the suction surfaces, and therefore, the brake disc rotor of the second preferred embodiment constituted by the above description gives an effect for improving the blowing and cooling efficiency by controlling any stagnation more effectively by preventing the generation of the flow separation on the suction surfaces of the outer end portions 51E and 52E of the fin 5 in comparison with that of the first preferred embodiment.

The preferred embodiments described above are illustrated for explanation, and it is to be understood that the present invention should not be limited to those embodiments. Any modifications and additions are possible so long as the claims, the detailed description of the invention and the description of the drawings are not opposed to the technical concept of the invention appreciated by the same skilled persons.

Although the first preferred embodiment describes the installation angles of the inner end portions 21I and 22I of the fin 2 which are set at 45°, i.e., the inlet angle of the stream, the installation angle can be set within the range of 30° through 70°, if the lowering of the capacity can be permitted more or less as explained on the basis of FIGS. 9 and 10 in accordance with the length of the fin, the width of the ventilation hole, the revolving speed of the rotor and other requirements.

The specific dimension of the disc rotor and fin or the like in the preferred embodiment described above is simply illustrated from the standpoint for facilitation of the execution by skilled persons concerned, and the present invention is not restricted to the dimension of the preferred embodiment of the invention.

What is claimed is:

1. A brake disc rotor comprising:
   at least two disc-shaped sliding plates on said brake disc rotor, said at least two disc-shaped sliding plates being substantially parallel to each other and each of said sliding plates having a sliding surface on one side thereof;
   a plurality of curved long partition walls radially extending from a radially inner portion to a radially outer portion of said sliding plates, each of said plurality of long partition walls being inclined with respect to a radial direction of the brake disc rotor;
   a plurality of curved short partition walls each having a radially inner tip end portion located at a midportion of said sliding plates and radially extending from said midportion of said sliding plates to said radially outer portion of said sliding plates, said short partition walls being positioned between adjacent ones of said long partition walls so as to define alternating long partition walls and short partition walls on said sliding plates, said short partition walls being inclined with respect to said radial direction of the brake disc rotor;
   a plurality of passages radially formed between said plurality of long and short partition walls; and
   a plurality of inlet and outlet openings communicating with said plurality of passages and opening inwardly and outwardly in said radial direction of said brake disc rotor;
   wherein:
   an installation angle at the radially inner tip end portion of said long partition wall defined between a line longitudinally extending from said radially inner tip end portion of said long partition wall and a line radially extending from said radially inner tip end portion of said long partition wall to a center of said brake disc rotor is close to a stream flow inlet angle defined between a line which defines a stream flow direction and a line radially extending from said center of said brake disc rotor to said line defining said stream flow direction, such that an inflow resistance at said inlet openings is reduced and a flow separation in said passages is prevented; and
   radially outer tip end portions of said long and short partition walls are set at a small negative angle with respect to the radial direction of the brake disk rotor.

2. A brake disc rotor according to claim 1, wherein: said long and short partition walls define curved fins.

3. A brake disc rotor according to claim 1, wherein: the radially inner tip end portions of said long and short partition walls are set along said stream flow inlet angle.

4. A brake disc rotor according to claim 1, wherein:
   an inner diameter of an axially outside one of said at least two sliding plates is less than an inner diameter of an axially inside one of said at least two sliding plates; and
   a height of the inner tip end portion of said long partition wall provided on the outside sliding plate gradually increases as the long partition wall comes closer to the radially outer portion of the outside sliding plate.

5. A brake disc rotor according to claim 4, wherein:
   an interval between the outside and inside sliding plates is gradually reduced as said disc-like sliding plates come closer to the outer portion of the sliding plates.

6. A brake disc rotor according to claim 4, wherein:
   the inlet opening is defined between the radially inner portions of said inside and outside sliding plates separated from each other in an inner peripheral wall of the brake disc rotor; and
   the outlet opening is defined between the radially outer portions of said inside and outside sliding plates separated from each other in an outer peripheral wall of the brake disc rotor.

7. A brake disc rotor according to claim 1, wherein:
   the installation angle at the radially inner tip end portion of said long partition wall with respect to the radial direction of the brake disc rotor is within the range of 30° through 70°.

8. A brake disc rotor according to claim 1, wherein:
   the installation angle at the radially inner tip end portion of said long partition wall with respect to the radial direction thereof is set within the range of 40° through 50°.

9. A brake disc rotor according to claim 1, wherein the installation angle at the inlet portion of said long partition wall with respect to the radial direction thereof is larger than the inlet angle of the stream flown into the inlet portion of the mutually adjacent long partition walls only by the angle within a predetermined permissible range.

10. A brake disc rotor according to claim 1, wherein the installation angle at the inlet portion of said long partition wall with respect to the radial direction thereof is smaller than the inlet angle of the stream flown into the inlet portion of the mutually adjacent long partition walls only by the angle within a predetermined permissible range.

11. A brake disc rotor according to claim 1, wherein:
    the installation angle at the radially inner tip end portion of said long partition wall with respect to the radial direction of the brake disc rotor is 45°.

12. A brake disc rotor according to claim 1, wherein:
    the radially inner tip end portion of said long partition wall linearly increases in height.

13. A brake disc rotor according to claim 1, wherein:
    the long and short partition walls define arch-shaped fins.

14. A brake disc rotor according to claim 1, wherein:
    the radially inner tip end portions of the long and short partition walls are gradually increased in thickness.

15. A brake disc rotor according to claim 1, wherein:
    a radially outer tip end portion of the short partition wall extends approximately along the radial direction of the brake disc rotor.

16. A brake disc rotor according to claim 1, wherein:
    a height of the inlet opening is approximately 65% of a height of the outlet opening.

17. A brake disc rotor according to claim 1, wherein:
    the radially inner tip end portion of said short partition wall is spaced from a line which radially extends from the center of said brake disc rotor toward the radially outer portion of said sliding plates and is tangent to the radially inner tip end portion of the long partition wall.

18. A brake disc rotor according to claim 17, wherein:
said radially inner portion of said sliding plates comprises radially inner tip end portions of said long partition walls, and said radially outer portion of said sliding plates comprises radially outer tip end portions of said long partition walls and short partition walls.

19. A brake disc rotor according to claim 1, wherein:
said installation angle at said radially inner tip end portion of said long partition wall is approximately equal to said stream flow inlet angle.

20. A brake disc rotor according to claim 1, wherein:
said radially inner tip end portions of said long and short partition walls are set at a positive angle with respect to said radial direction of the brake disc rotor; and
radially mid portions of said long and short partition walls are set parallel to said radial direction thereof.

21. A brake disc rotor according to claim 20, wherein:
said radially outer tip end portions of said long and short partition walls are set at a negative angle with respect to said radial direction thereof.

22. A brake disc rotor according to claim 21, wherein:
said radially inner tip end portion of said long partition wall is positioned at a leading side of a rotational direction of the brake disc rotor; and
said radially outer tip end portion of said long partition wall is positioned at a trailing side of said rotational direction thereof.

23. A brake disc rotor according to claim 21, wherein:
said radially outer tip end portion of said long partition wall is positioned between said radially inner tip end portion and said mid portion of said long partition wall in a rotational direction of the brake disc rotor.

24. A brake disc rotor according to claim 21, wherein:
said radially inner tip end portions of said long and short partition walls are set at a large positive angle with respect to the radial direction of the brake disc rotor; and
said radially outer tip end portions of said long and short partition walls are set at a small negative angle with respect to the radial direction thereof.

25. A brake disc rotor according to claim 1, wherein:
said radially inner tip end portions of said long and short partition walls are inclined toward the clockwise direction with respect to said radial direction of the brake disc rotor; and
said radially outer tip end portions of said long and short partition walls are inclined toward the counterclockwise direction with respect to said radial direction of the brake disc rotor.

26. A brake disc rotor according to claim 1, wherein:
said long and short partition walls comprise forward curved vanes, respectively.

27. A brake disc rotor according to claim 1, wherein:
the radiuses of curvature on radially outer portions of said long and short partition walls are smaller than that on radially inner portions thereof.

* * * * *